US006963369B1

(12) United States Patent
Olding

(10) Patent No.: US 6,963,369 B1
(45) Date of Patent: Nov. 8, 2005

(54) METHOD FOR CAPTURING AND STORING IMAGE INFORMATION FOR MULTIPLE SAMPLING OPERATIONS IN A DIGITAL PIXEL SENSOR

(75) Inventor: Benjamin P. Olding, Redwood City, CA (US)

(73) Assignee: Pixim, Inc., Mountain View, CA (US)

( * ) Notice: Subject to any disclaimer, the term of this patent is extended or adjusted under 35 U.S.C. 154(b) by 617 days.

(21) Appl. No.: 10/114,702

(22) Filed: Apr. 1, 2002

(51) Int. Cl.[7] .............................................. H04N 5/217
(52) U.S. Cl. ................ 348/241; 348/222.1; 348/231.2; 348/308; 348/362
(58) Field of Search .......................... 348/231.3, 231.6, 348/241, 294, 302, 307–310

(56) References Cited

U.S. PATENT DOCUMENTS 5,461,425 A * 10/1995 Fowler et al. .............. 348/294
5,801,657 A * 9/1998 Fowler et al. .............. 341/155
6,229,133 B1 * 5/2001 Hynecek .................. 250/208.1
6,538,593 B2 * 3/2003 Yang et al. ................. 341/155
6,665,010 B1 * 12/2003 Morris et al. ............... 348/297
6,831,689 B2 * 12/2004 Yadid-Pecht ................ 346/297
6,844,896 B2 * 1/2005 Henderson et al. ......... 348/241
2002/0122126 A1 * 9/2002 Lenz .......................... 348/297

FOREIGN PATENT DOCUMENTS

JP 04313949 * 11/1992 ............ H04N 1/04

OTHER PUBLICATIONS

U.S. Appl. No.: 09/823,838; 09/823,843; 09/274,202; 09/567,638; and 09/567,786.*

* cited by examiner

*Primary Examiner*—Ngoc-Yen Vu
*Assistant Examiner*—Carramah J. Quiett
(74) *Attorney, Agent, or Firm*—Carmen C. Cook; Patent Law Group LLP

(57) ABSTRACT

A method for storing image information in a digital pixel sensor is disclosed for reducing the size of the memory needed to facilitate multiple sampling and correlated double sampling. In one embodiment, an image sensor includes a sensor array of pixel elements generating digital pixel data and a data memory for storing pixel data of each pixel element. The data memory allocates for each pixel element an m-bit pixel data field for storing pixel data and an n-bit CDS data field for storing reset value associated with each pixel element. The data memory stores m+n bits of pixel data in the pixel data field and the CDS data field for pixel data exceeding the predetermined threshold level. The data memory stores m bits of pixel data in the pixel data field for pixel data not exceeding the predetermined threshold level.

20 Claims, 13 Drawing Sheets

| **Pixel C** | | Pixel Data Field | | | | | CDS Data Field | | | |
|---|---|---|---|---|---|---|---|---|---|---|
| Reset | | | | | | | x | x | x | x |
| Capture#1 | 0 | M | M | M | M | M | x | x | x | x |
| Capture#1 | 0 | M | M | M | M | M | x | x | x | x |
| Capture#2 | 1 | M | M | M | M | M | x | x | x | x |
| Capture#2 | 1 | M | M | M | M | M | x | x | x | x |
| Capture#2 | 0 | M | M | M | M | M | x | x | x | x |
| Capture#3 | 0 | P | P | P | P | P | x | x | x | x |
| Capture#3 | 0 | P | P | P | P | P | P | P | P | P |
| Capture#3 | 1 | P | P | P | P | P | P | P | P | P |
| Capture#4 | 1 | P | P | P | P | P | P | P | P | P |

460 462 464

Threshold Indicator

*Figure 8C*

| **Pixel D** | | Pixel Data Field | | | | | CDS Data Field | | | |
|---|---|---|---|---|---|---|---|---|---|---|
| Reset | | | | | | | x | x | x | x |
| Capture#1 | 0 | M | M | M | M | M | x | x | x | x |
| Capture#1 | 0 | M | M | M | M | M | x | x | x | x |
| Capture#2 | 1 | M | M | M | M | M | x | x | x | x |
| Capture#2 | 1 | M | M | M | M | M | x | x | x | x |
| Capture#2 | 0 | M | M | M | M | M | x | x | x | x |
| Capture#3 | 1 | M | M | M | M | M | x | x | x | x |
| Capture#3 | 1 | M | M | M | M | M | x | x | x | x |
| Capture#3 | 0 | M | M | M | M | M | x | x | x | x |
| Capture#4 | 0 | Q | Q | Q | Q | Q | x | x | x | x |
| Capture#4 | Q | Q | Q | Q | Q | Q | x | x | x | x |

460 462 464

Threshold Indicator

*Figure 8D*

| **Pixel C** | Pixel Data Field | | | | | | CDS Data Field | | | |
|---|---|---|---|---|---|---|---|---|---|---|
| Reset | | | | | 1 | 1 | x | x | x | x |
| Capture#1 | 0 | M | M | M | 1 | 1 | x | x | x | x |
| Capture#1 | 0 | M | M | M | 1 | 1 | x | x | x | x |
| Capture#2 | 1 | M | M | M | 1 | 1 | x | x | x | x |
| Capture#2 | 1 | M | M | M | 1 | 1 | x | x | x | x |
| Capture#2 | 0 | M | M | M | 1 | 1 | x | x | x | x |
| Capture#3 | 0 | P | P | P | 1 | 1 | x | x | x | x |
| Capture#3 | 0 | P | P | P | 0 | 0 | P | P | P | P |
| Capture#3 | P | P | P | P | 0 | 0 | P | P | P | P |
| Capture#4 | P | P | P | P | 0 | 0 | P | P | P | P |

760 762 763 764

Threshold Indicator

*Figure 9C*

| Pixel D | Pixel Data Field | | | | | | CDS Data Field | | | |
|---|---|---|---|---|---|---|---|---|---|---|
| Reset | | | | | 1 | 1 | x | x | x | x |
| Capture#1 | 0 | M | M | M | 1 | 1 | x | x | x | x |
| Capture#1 | 0 | M | M | M | 1 | 1 | x | x | x | x |
| Capture#2 | 1 | M | M | M | 1 | 1 | x | x | x | x |
| Capture#2 | 1 | M | M | M | 1 | 1 | x | x | x | x |
| Capture#2 | 0 | M | M | M | 1 | 1 | x | x | x | x |
| Capture#3 | 1 | M | M | M | 1 | 1 | x | x | x | x |
| Capture#3 | 1 | M | M | M | 1 | 1 | x | x | x | x |
| Capture#3 | 0 | M | M | M | 1 | 1 | x | x | x | x |
| Capture#4 | 0 | Q | Q | Q | 1 | 1 | x | x | x | x |
| Capture#4 | Q | Q | Q | Q | Q | Q | x | x | x | x |

760 762 763 764

Threshold Indicator

Figure 9D

METHOD FOR CAPTURING AND STORING IMAGE INFORMATION FOR MULTIPLE SAMPLING OPERATIONS IN A DIGITAL PIXEL SENSOR

CROSS-REFERENCE TO RELATED APPLICATION

The present application is related to commonly assigned U.S. patent application Ser. No. 09/823,838, entitled "Method And Apparatus for Storing Image Information for Multiple Sampling Operations in a Digital Pixel Sensor," by Benjamin P. Olding and Justin Reyneri, filed Mar. 30, 2001; and commonly assigned U.S. patent application bearing Ser. No. 09/823,843, entitled "Method And Apparatus for Companding Pixel Data in a Digital Pixel Sensor," by Justin Reyneri and Benjamin P. Olding, filed Mar. 30, 2001.

BACKGROUND OF THE INVENTION

1. Field of the Invention

The present invention relates image sensor systems, and in particular, the present invention relates to a method for selectively storing reset values in a digital image sensor to facilitate correlated double sampling.

2. Description of the Related Art

A CMOS image sensor with pixel level analog-to-digital conversion is described in U.S. Pat. No. 5,461,425 of B. Fowler et al. (the '425 patent). Such an image sensor, referred to as a digital pixel sensor (DPS), provides a digital output signal at each pixel element representing the light intensity detected by that pixel element. The combination of a photodetector and an analog-to-digital (A/D) converter in an area image sensor helps enhance detection accuracy, reduce power consumption, and improves overall system performance.

In the DPS array of the '425 patent, the analog-to-digital conversion (ADC) is based on first order sigma delta modulation. While this ADC approach requires fairly simple and robust circuits, it has the disadvantages of producing too much data and suffering from poor low light performance. U.S. Pat. No. 5,801,657 of Fowler et al., and U.S. patent application Ser. No. 09/274,202 provide alternative ADC mechanisms that can significantly improve the overall system performance while minimizing the size of the A/D converters. The aforementioned patents and patent application are incorporated herein by reference in their entireties.

Copending and commonly assigned U.S. patent application Ser. No. 09/567,638, entitled "Integrated Digital Pixel Sensor Having a Sensing Area and a Digital Memory Area" of David Yang et al., describes an integrated DPS sensor with an on-chip memory for storing at least one frame of pixel data. The incorporation of an on-chip memory in a DPS sensor alleviates the data transmission bottleneck problem associated with the use of an off-chip memory for storage of the pixel data. In particular, the integration of a memory with a DPS sensor makes feasible the use of multiple sampling for improving the quality of the captured images. Multiple sampling is a technique capable of achieving a wide dynamic range in an image sensor without many of the disadvantages associated with other dynamic range enhancement techniques, such as degradation in signal-to-noise ratio and increased implementation complexity. Copending and commonly assigned U.S. patent application Ser. No. 09/567,786, entitled "Multiple Sampling via a Time-indexed Method to Achieve Wide Dynamic Ranges" of David Yang et al., describes a method for facilitating image multiple sampling using a time-indexed approach. The aforementioned patent applications are incorporated herein by reference in their entireties.

FIG. 1 duplicates FIG. 3 of the aforementioned '786 patent application and shows a functional block diagram of an image sensor 300. The operation of image sensor 300 using multiple sampling is described in detail in the '786 patent application. Image sensor 300 includes a DPS sensor array 302 which has an N by M array of pixel elements. Sensor array 302 is similar to the digital pixel sensor described in the '425 patent and incorporates pixel level analog-to-digital conversion. A sense amplifier and latch circuit 304 is coupled to sensor array 302 to facilitate the readout of digital signals from sensor array 302. The digital signals (also referred to as digital pixel data) are stored in digital pixel data memory 310. To support multiple sampling, image sensor 300 also includes a threshold memory 306 and a time index memory 308 coupled to sensor array 302. Threshold memory 306 stores information for each pixel indicating whether the light intensity value measured by each pixel in sensor array 302 has exceeded a predetermined threshold level. In this example, the information is stored as an one-bit threshold indicator bit. The exposure time indicating when the light intensity measured by each pixel has passed the threshold level is stored in time index memory 308. In this example, the time index value is a two-bit value identifying each time exposure. As a result of this memory configuration, the pixel data for each pixel element in sensor array 302 can be individually time-stamped by threshold memory 306 and time index memory 308 and stored in digital pixel data memory 310.

With the memory configuration outlined above and illustrated in FIG. 1, image sensor 300 can implement multiple sampling to improve the quality of an image. In multiple sampling, each pixel element is exposed to an image at two or more different exposure times in order to compensate for bright and dark portions of the image. Additionally, the information regarding the exposure time associated with each pixel and the integrated intensity for that pixel is stored in time index memory 308 and digital memory 310 for use in computing the simulated pixel intensity value when needed.

Sensor array 302 is an N by M array of pixels where each pixel outputs a digitized pixel voltage signal having k bits. Thus, the size of threshold memory 306 is N by M bits and the size of time index memory 308 is N by M by m bits where m is the number of bits representing the time index values. For example, when the resolution of sensor array 302 is 1024 by 1024 pixels, each pixel outputting 10 bits each (i.e., N=M=1024 and k=10), the size of threshold memory 306 is 1 megabits, the size of time index memory 308 with a 2-bit time index value is 2 megabits, and digital pixel data memory 310 is at least 10 megabits (or 1024×1024×10 bits) for storing one frame of image data.

Correlated double sampling (CDS) is a method applied in image sensors for eliminating non-uniformity in the sensor array. CDS can be used to correct for the variable comparator offset between the photodetectors in the array. When CDS is implemented, the sensor array is reset at the start of each capture. Then, the voltage present at each of the photodetectors (also called the "CDS reset value" or "reset value") is measured and stored in a designated memory location of the on-chip memory of image sensor 300. Subsequently, for each frame of pixel data captured by the sensor array, the stored reset values are subtracted from the corresponding pixel intensity value to derive the pixel data. To implement CDS in an image sensor, memory space must be allocated to store the reset values for all of the pixel elements in the sensor array since the reset value is different for each pixel element. For instance, if the reset values are represented as 4-bit values, then 4 megabits of memory space will be needed to store the reset values for sensor array 302 in image sensor 300 of FIG. 1.

To implement multiple sampling and CDS in an image sensor, memory space must be provided to store image information such as the threshold indicator bit, the time index value and the reset values. When image sensor 300 in the example above is implemented in an integrated circuit, the size of the on-chip memory must be at least 17 megabits. If the resolution of the sensor array (i.e. the number of pixel elements) increases, the size of the on-chip memory will increase correspondingly. Integrating a large on-chip memory in an image sensor not only increases manufacturing cost but also adversely impacts yield. Therefore, it is desirable to minimize the size of the on-chip memory while supporting multiple sampling and CDS operations in a digital image sensor.

SUMMARY OF THE INVENTION

According to an embodiment of the present invention, an image sensor includes a sensor array made up of a two-dimensional array of pixel elements. The sensor array outputs digital signals as pixel data representing an image of a scene. The sensor array generates multiple representations of the image at a multiple exposure times. The sensor array further includes a data memory, in communication with the sensor array, for storing image information for each of the pixel elements. The data memory allocating for each pixel element an m-bit pixel data field for storing pixel data generated by the sensor array and an n-bit CDS data field for storing reset value associated with each pixel element.

In operation, the data memory uses a first bit of the pixel data field as a threshold indicator indicating whether pixel data associated with each pixel element has exceeded a predetermined threshold level. The data memory stores m+n bits of pixel data in the pixel data field and the CDS data field for pixel data exceeding the predetermined threshold level. On the other hand, the data memory stores m bits of pixel data in the pixel data field for pixel data not exceeding the predetermined threshold level.

The image information storage method of the present invention selectively stores CDS reset values or additional bits of pixel data in the CDS data field. Specifically, the CDS reset values are preserved only when the pixel intensity value is small, such as when the pixel intensity value is less than the threshold level. The image information storage method of the present invention allows for a more effective use of memory space and can realize a reduction in the size of digital memory needed to facilitate multiple sampling and CDS in an image sensor.

The present invention is better understood upon consideration of the detailed description below and the accompanying drawings.

BRIEF DESCRIPTION OF THE DRAWINGS

FIGS. 8A to 8D are memory cells illustrating the progression of image information that are stored in memory cells associated with pixels A, B, C and D of FIG. 4 under the operation of the image information storage method of the present embodiment.

FIGS. 9A to 9D are memory cells illustrating the progression of image information that are stored in memory cells associated with pixels A, B, C and D of FIG. 4 under the operation of the image information storage method of an alternate embodiment.

In the present disclosure, like objects which appear in more than one figure are provided with like reference numerals.

DETAILED DESCRIPTION OF THE PREFERRED EMBODIMENTS

In accordance with the present invention, a method for capturing and storing image information in a digital pixel sensor operates to reduce the size of the memory needed to facilitate multiple sampling and correlated double sampling (CDS). The image information storage method of the present invention operates to selectively store CDS reset values or additional bits of pixel data to improve the image resolution of the captured images while reducing the size of the on-chip memory needed to store the image information. By reducing the size of the on-chip memory, the present invention provides the benefits of reducing manufacturing cost and improving production yield.

In the present description, a digital pixel sensor (DPS) array or a sensor array refers to a digital image sensor having an array of photodetectors where each photodetector produces a digital output signal. In one embodiment of the present invention, the DPS array implements the digital pixel sensor architecture illustrated in FIG. 2 and described in the aforementioned '425 patent. The DPS array of the '425 patent utilizes pixel level analog-to-digital conversion to provide a digital output signal at each pixel. The pixels of a DPS array are sometimes referred to as a "sensor pixel" or a "sensor element" or a "digital pixel," which terms are used to indicate that each of the photodetectors of a DPS array includes an analog-to-digital conversion (ADC) circuit, and is distinguishable from a conventional photodetector which includes a photodetector and produces an analog signal. The digital output signals of a DPS array have advantages over the conventional analog signals in that the digital signals can be read out at a much higher speed. Of course, other schemes for implementing a pixel level A/D conversion in an area image sensor may also be used in the image sensor of the present invention.

Figure 2:
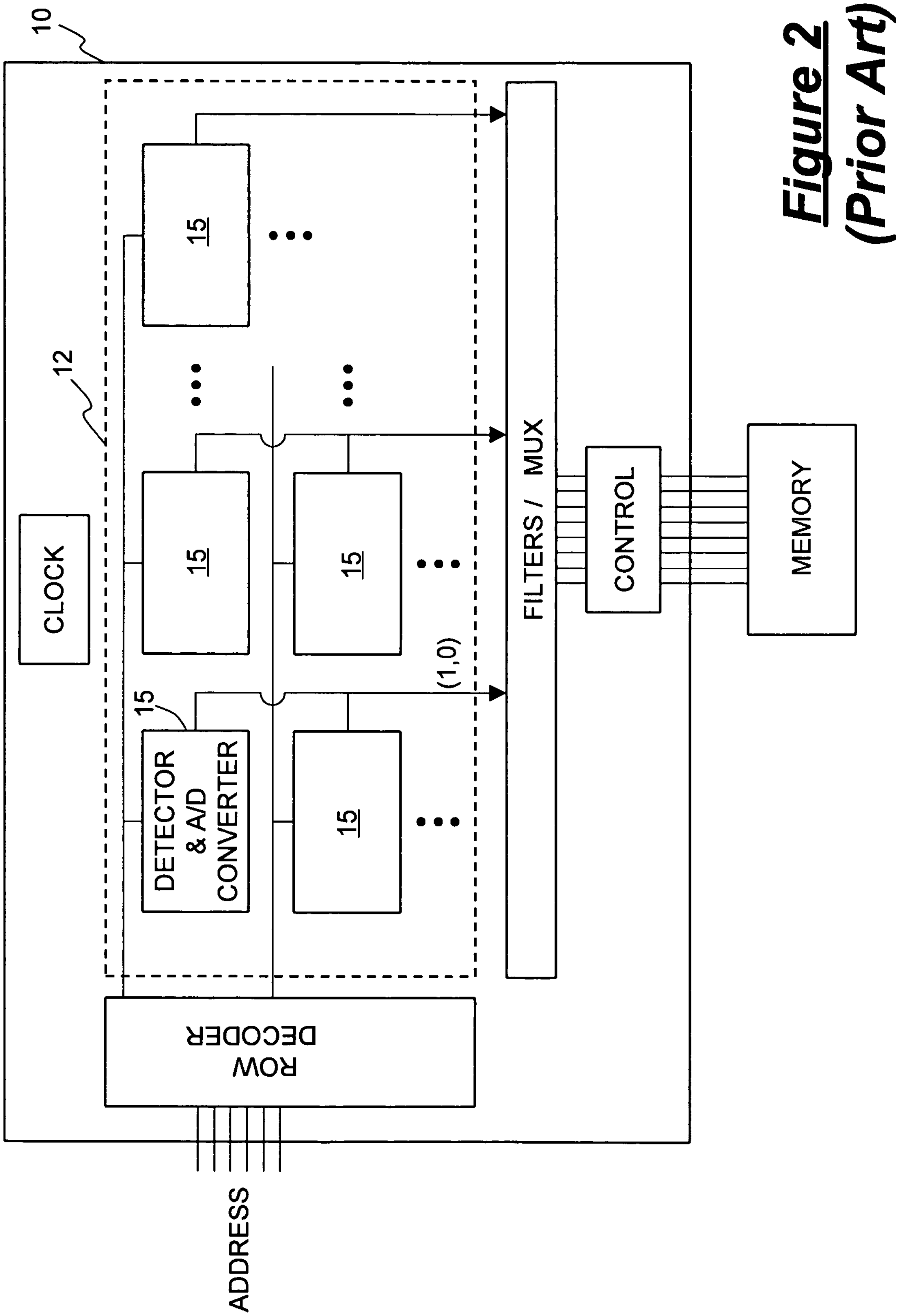
FIG. 2 is a block diagram of a digital image sensor as described in U.S. Pat. No. 5,461,425 of Fowler et al.

In the digital pixel sensor architecture shown in FIG. 2, a dedicated ADC scheme is used. That is, each of pixel element 15 in sensor array 12 includes a ADC circuit. The image sensor of the present invention can employ other DPS architectures, including a shared ADC scheme. In the shared ADC scheme, instead of providing a dedicated ADC circuit to each photodetector in a sensor array, an ADC circuit is shared among a group of neighboring photodetectors. For example, in one embodiment, four neighboring photodetectors may share one ADC circuit situated in the center of the four photodetectors. The ADC circuit performs A/D conversion of the output voltage signal from each photodetectors by multiplexing between the four photodetectors. The shared ADC architecture retains all the benefits of a pixel level analog-to-digital conversion while providing the advantages of using a much smaller circuit area, thus reducing manufacturing cost and improving yield.

In one embodiment of the present invention, the ADC circuit of each digital pixel or each group of digital pixel is implemented using the Multi-Channel Bit Serial (MCBS) analog-to-digital conversion technique described in the aforementioned '657. The MCBS ADC technique of the '657 patent can significantly improve the overall system performance while minimizing the size of the ADC circuit. Furthermore, as described in the '657 patent, an MCBS ADC has many advantages applicable to image acquisition and more importantly, facilitates high-speed readout.

Figure 3:
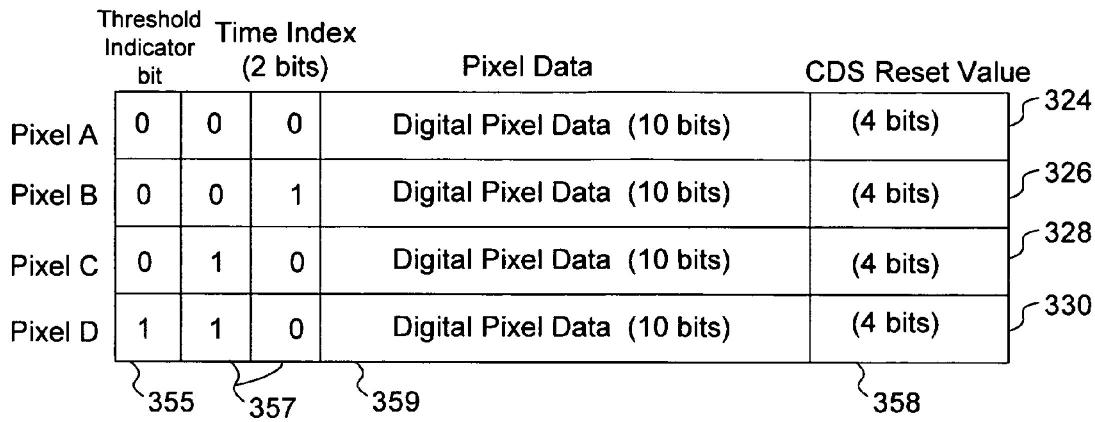
FIG. 3 illustrates four rows of exemplary memory cells representative of the memory configuration typically used by a sensor array for storing image information.

To facilitate multiple sampling and CDS in a DPS image sensor, memory locations are provided for storing the digital pixel data, the threshold indicator information, the time index values, and the CDS reset values associated with each pixel element in the sensor array. In the following description, the digital pixel data, the threshold indicator information, the time index values and the CDS reset values generated in an image sensor are collectively referred to as "image information." FIG. 3 illustrates four rows of exemplary memory cells representative of the memory configuration typically used by a sensor array for storing such image information. FIG. 3 is provided to illustrate the typical memory configuration used for facilitating multiple sampling and CDS and to provide a contrast to the innovative image information storage method of the present invention.

Referring to FIG. 3, each row of memory cells contains 17 databits for storing image information including the threshold indicator bit (memory cell 355), the time index value (2-bit memory cells 357), the digital pixel data (10-bit memory cells 359), and the CDS reset values (4-bit memory cells 358). In the configuration shown in FIG. 3, 17-bits of data memory are used to store the pertinent image information for each pixel element in the image sensor. When the image information storage method and pixel data companding method described in the aforementioned '838 and '843 patent applications are applied, the number of memory cells can be reduced to as little as 14 bits, where 4 bits represent the CDS reset values. Of course, the CDS reset values can be represented in any number of bits depending on the resolution needed and how large the reset values can potentially be.

In conventional image sensors, CDS reset values are stored for all pixels in the image sensor array, regardless of the pixel intensity values. However, in practice, the CDS reset values are useful only for small pixel intensity values, that is, when the image data is dark. When the pixel intensity values are small (the image data are dark), the error presented by the CDS reset values can constitute a large percentage of the pixel data so that normalization of the pixel data using the CDS reset values becomes important. On the other hand, when the pixel intensity values are large (the image data are bright), the CDS reset values can be so small as compared to the pixel intensity values that the reset values are negligible. Therefore, storing the CDS reset values for all pixel elements, regardless of the pixel intensity values, can be a wasteful use of memory. In accordance with the present invention, the novel image information storage method alternate between storing CDS reset values or storing additional bits of pixel data to conserve memory space. In one embodiment, the CDS reset value for a pixel is stored only when the pixel intensity value for that pixel is small. The image information storage method of the present invention allows for a more effective use of memory space and can realize a reduction in the size of digital memory needed to facilitate multiple sampling and CDS in an image sensor.

Figure 1:
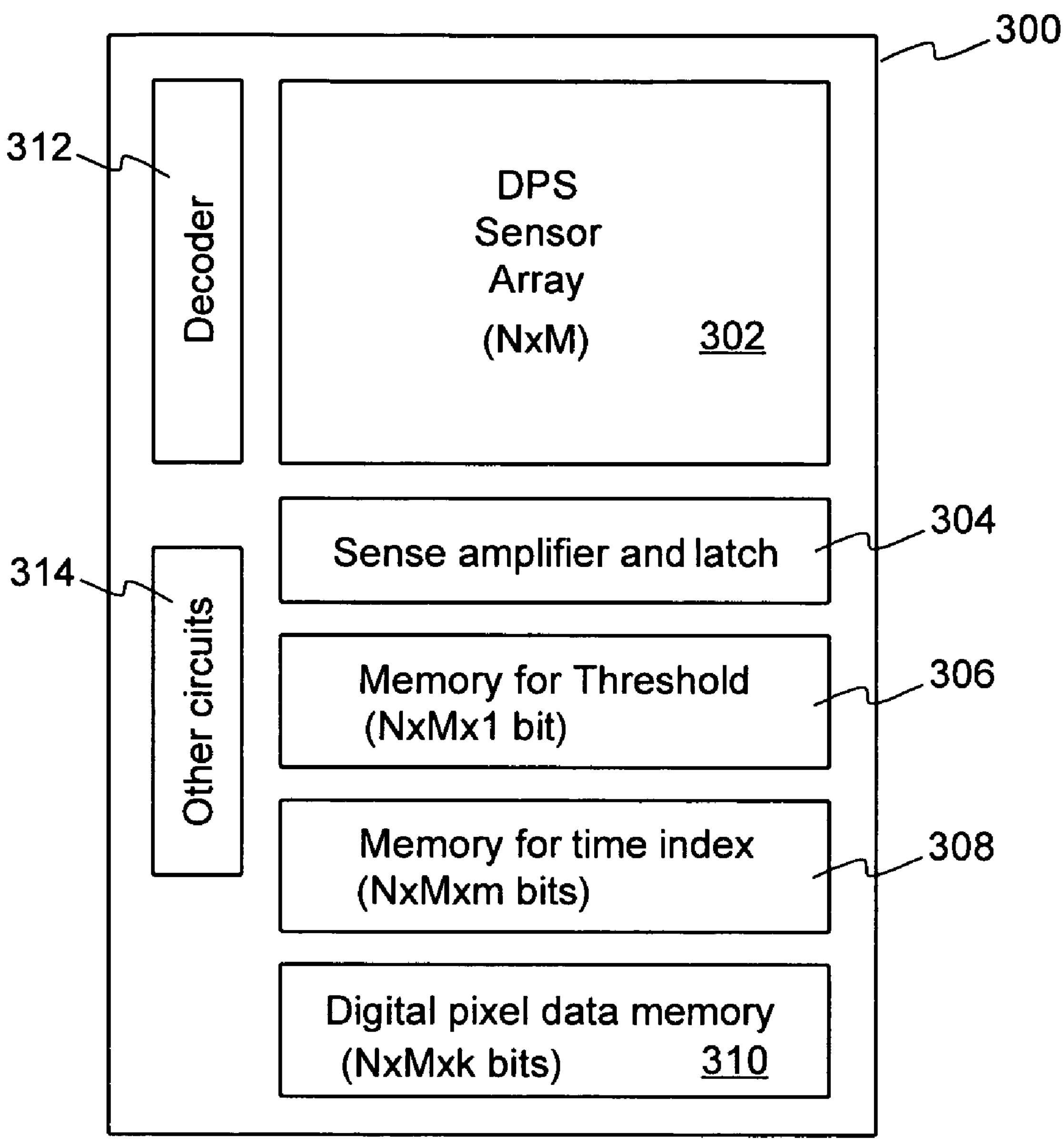
FIG. 1 is a functional block diagram of an image sensor as described in U.S. patent application Ser. No. 09/567,786.
Figure 4:
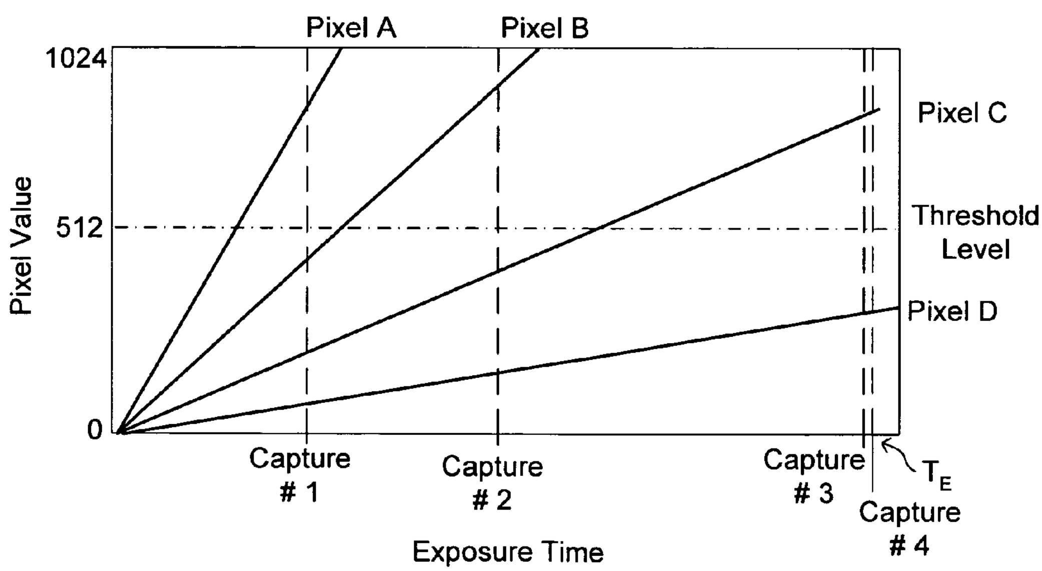
FIG. 4 illustrates the pixel intensity values vs. exposure time for four representative pixels A, B, C, and D detected by a DPS array.

FIG. 4 illustrates the pixel intensity values vs. exposure time for four representative pixels A, B, C, and D detected by a DPS array such as array 302 of FIG. 1. FIG. 4 illustrates the multiple sampling operation in a DPS array and will be used in conjunction with the remaining figures to illustrate the operation of the image storage information method of the present invention. In FIG. 4, the multiple sampling operation use a 50% threshold level. Of course, in other implementations, a different threshold level (such as 30% or 90%) can be used. At each capture interval, pixel values that exceed the threshold level (i.e., 50%) will be stored and will not be further updated.

When multiple sampling is applied, multiple captures of the pixel data are made within a snapshot of a scene where a snapshot of a scene has an exposure time denoted by $T_E$ in FIG. 4. In the present illustration, four captures are made within a single snapshot and the capture intervals are distributed at exposure times of 1T, 2T, 4T and 4T'. In one implementation, exposure times 4T and 4T' (captures# 3 and 4) can be the same exposure time but represent two sensor readout of the pixel data taken at the same exposure time. In other implementations, exposure times 4T and 4T' can be two different exposure times and two separate readouts of the pixel data.

Referring to FIG. 4, at capture# 1, the multiple sampling logic circuit of the image sensor compares the pixel values readout from each pixel element of the DPS array and determines which of the pixel intensity values exceeds the 50% threshold level. For example, in FIG. 4, pixel A has an intensity value exceeding the 50% threshold level while pixels B to D have intensity values below the threshold level. Pixel data for pixel A is recorded and the threshold indicator bit associated with pixel A is set to prevent further update of the pixel data. The time index value associated with capture# 1 is also stored and will be used subsequently to compute the simulated pixel value for pixel A. The multiple sampling operation continues with sensor readout being taken at capture# 2, capture# 3 and capture #4. Each time the pixel intensity value of a pixel exceeds the 50% threshold level, the threshold indicator bit is set and the associated time index for that pixel is stored in the time index memory. The measured digital pixel values are stored in the pixel data memory (such as memory 310 of FIG. 1). In the present illustration, pixel B has a pixel value which exceeds the threshold level at capture# 2 and pixel C has a pixel value which exceeds the threshold level at capture #3. Pixel D has a pixel value which does not exceed the threshold at the last exposure time and the pixel value is read out at capture# 4.

Figure 5:
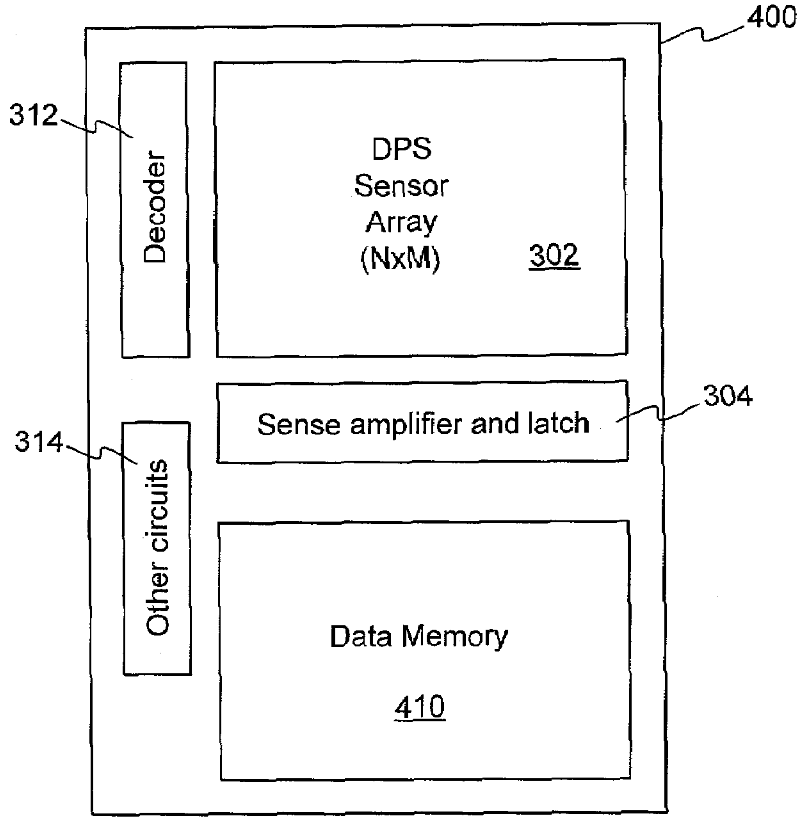
FIG. 5 is a functional block diagram of an image sensor according to one embodiment of the present invention.

Turning now to the present invention, FIG. 5 is a functional block diagram of an image sensor 400 according to one embodiment of the present invention. In the present description, like objects which appear in more than one figure are provided with like reference numerals to simplify the discussion. Image sensor 400 includes a DPS sensor array 302 which operates in the same manner as previously described and provides digital pixel data as output signals.

Image sensor 400 further includes a data memory 410 which integrates the storage of the threshold indicator information, the time index values, the pixel data and the CDS reset values. The image information storage method of the present invention minimizes the amount of memory needed in memory 410 to facilitate multiple sampling and correlated double sampling. Of course, image sensor 400 may include other circuitry such as decoder 312 and sense amplifier and latch circuit 304 which operate in the same manner as image sensor 300.

Figure 6:
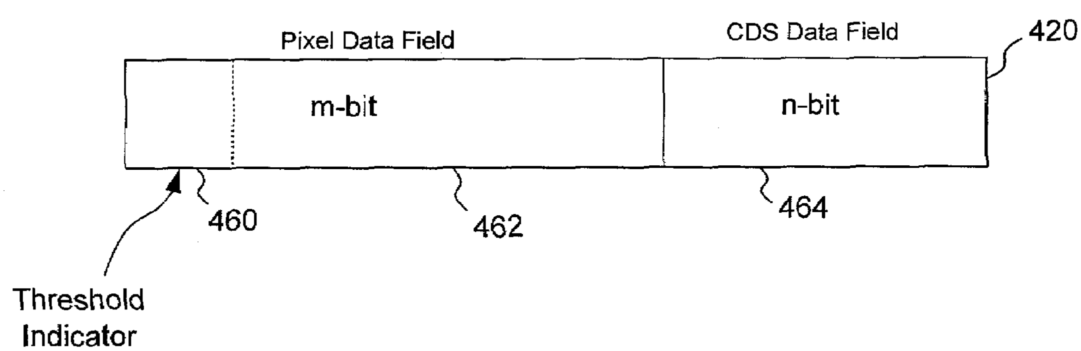
FIG. 6 illustrates one row of memory cells in the data memory of FIG. 5 for storing image information associated with one pixel element in the sensor array according to one embodiment of the present invention.

FIG. 6 illustrates one row of memory cells in data memory 410 for storing image information associated with one pixel element in sensor array 302 according to one embodiment of the present invention. Referring to FIG. 6, row 420 includes two data fields: an m-bit pixel data field 462 and an n-bit CDS data field 464. Thus, in accordance with the present invention, r bits (r=m+n) of memory cells are used to encode all of the image information required to facilitate multiple sampling and CDS. In the present embodiment, the threshold indicator bit 460 is encoded in the most significant bit (MSB) of pixel data field 462. In the present embodiment, the time index value and the pixel data are encoded as codewords where each codeword uniquely identifies a pixel value captured at a given capture interval. The codewords can be applied in image sensor 400 through the use of a programmable analog-to-digital converter for converting the measured pixel intensity value into the corresponding codeword. By decoding the codeword stored in row 420, such by as using a look-up table, the pixel value and the exposure time when the pixel value was captured can be uniquely identified.

In accordance with the present invention, the image information storage method alternates between storing the CDS reset values or additional pixel data bits in CDS data field 464. The CDS reset value for a given pixel is preserved only when the pixel data is a small value (near zero) representing a dark image in the scene to be captured. When the pixel data is a small value, the CDS reset value is needed to normalize the pixel data to improve the resolution of the image sensor. When the pixel data is a large value, the CDS reset value is not useful and the image information storage method of the present invention will overwrite the CDS data field with additional bits of pixel data. In this manner, a more efficient use of memory space in data memory 410 can be achieved. Image sensor 400 can be made with a smaller device size and can realize reduced cost and increased production yield. In one embodiment, pixel data field 462 is a 6-bit data field and CDS data field 464 is a 4-bit data field. Thus, in the present embodiment, a total of 10 bits is used to store all of the image information, as opposed to a total of 17 bits used in the prior methods of FIG. 3. Consequently, in the present embodiment, a total of N×M×7 bits of memory cells is saved by using the image information storage method according to the present embodiment of the present invention.

To facilitate the description of the present invention, FIG. 6 illustrates a row of 10-bit memory cells explicitly allocated for each pixel. However, it is known to those skilled in the art that other memory allocation schemes are possible, such as storing the pixel data field and the CDS data field in different rows of memory cells in data memory 410.

Figure 7A:
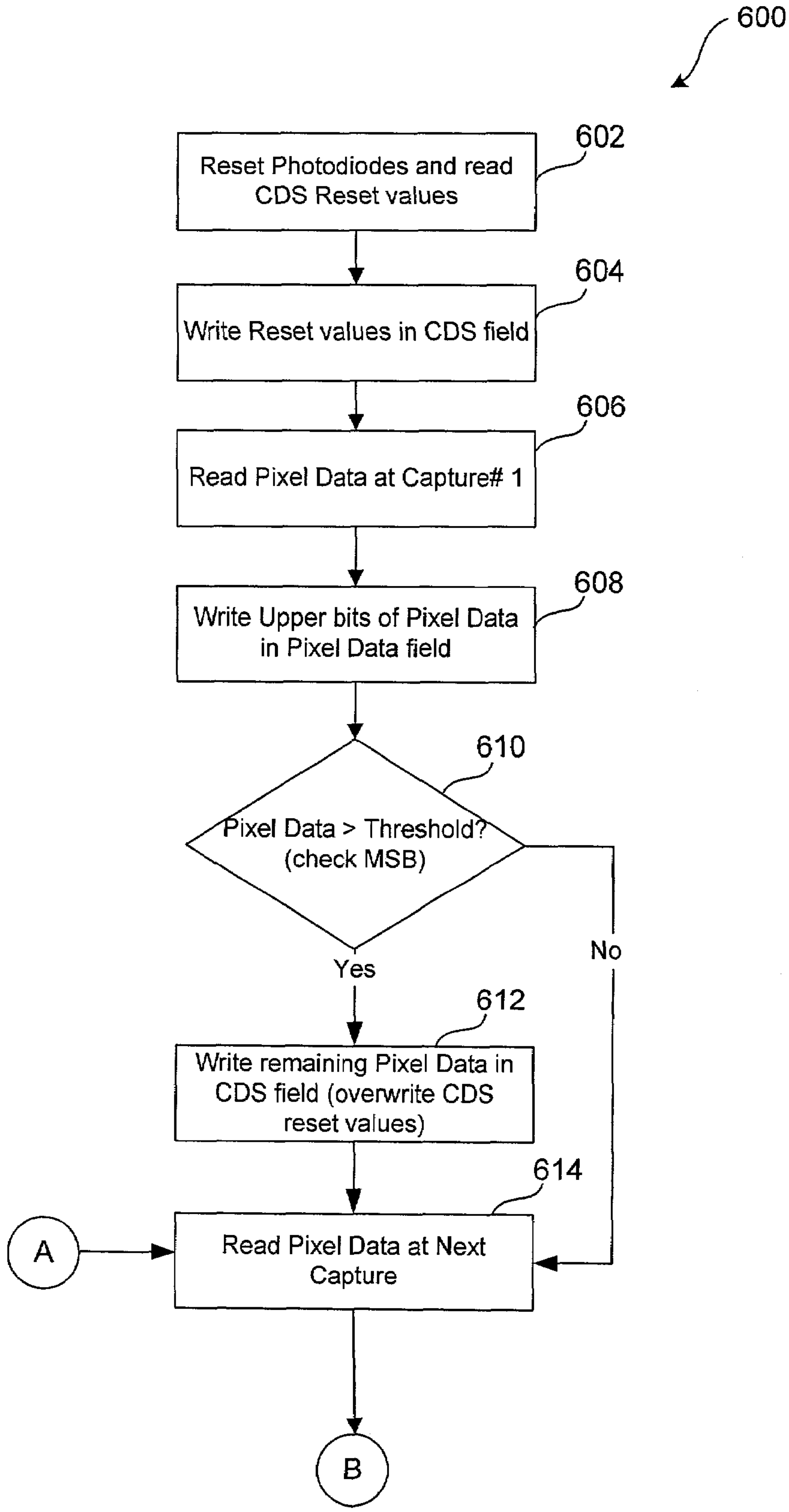
FIGS. 7A to 7C are flowcharts illustrating the operation of the image information storage method according to one embodiment of the present invention.
Figure 7B:
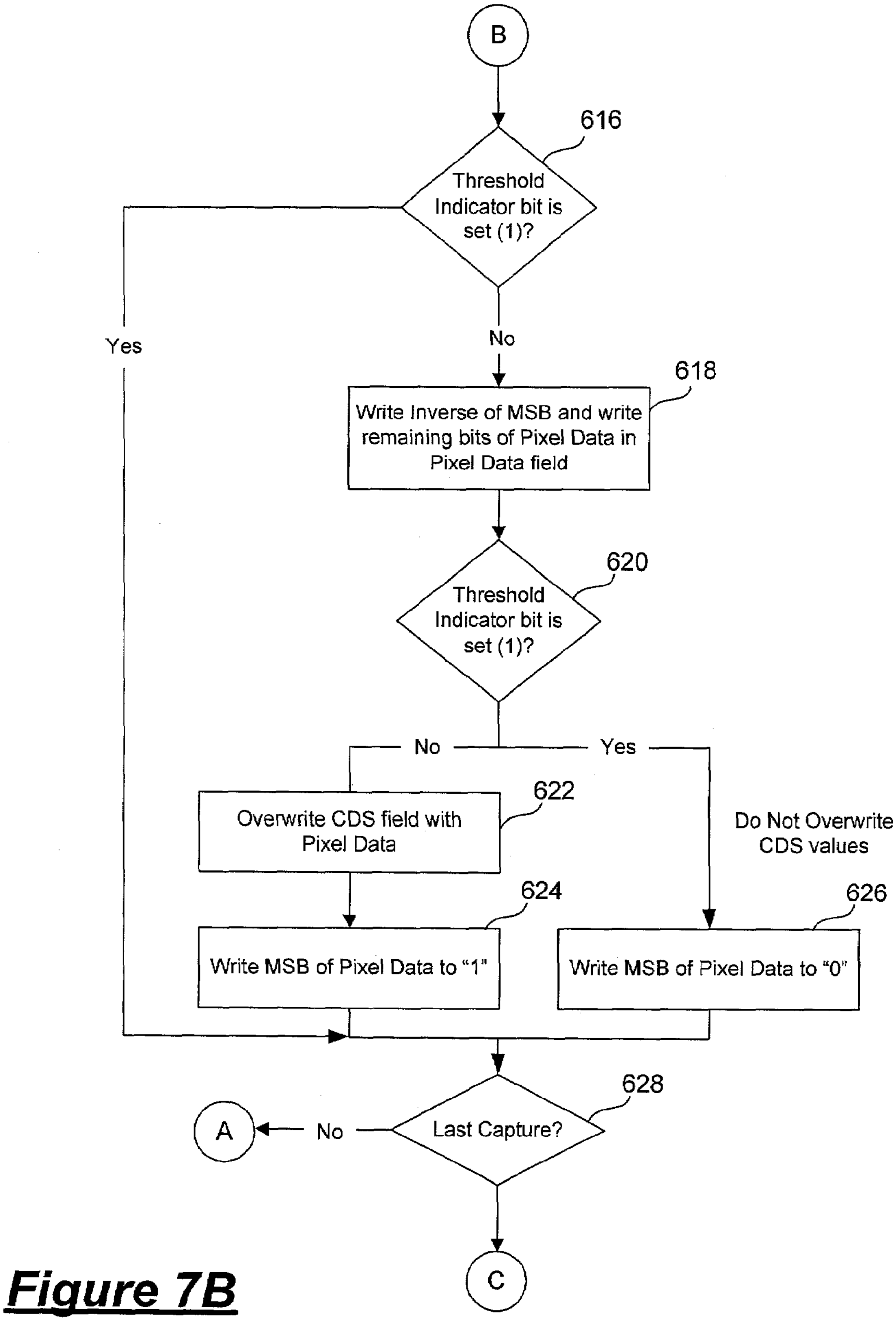
Figure 7C:
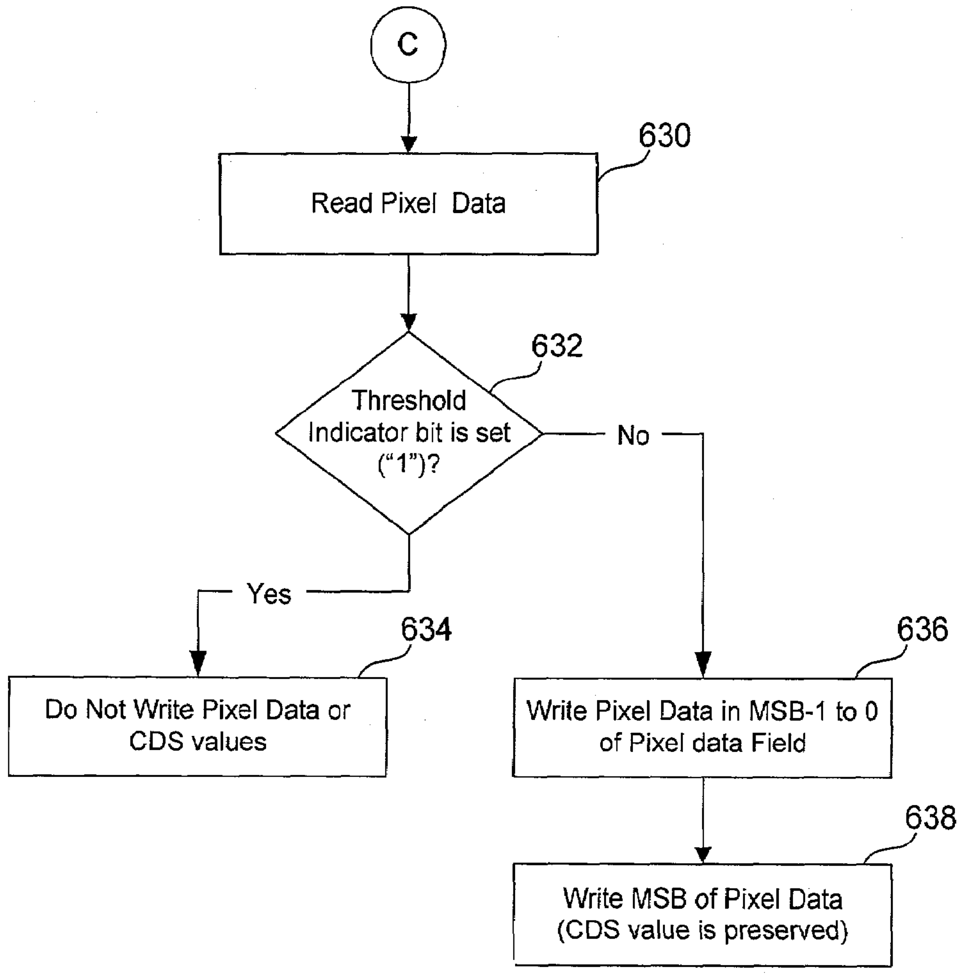

FIGS. 7A to 7C are flowcharts illustrating the operation of the image information storage method according to one embodiment of the present invention. FIGS. 8A to 8D are memory cells illustrating the progression of image information that are stored in memory cells associated with pixels A, B, C and D of FIG. 4 under the operation of the image information storage method of the present embodiment. The operation of the image information storage method of the present invention will be described in conjunction with FIG. 4.

According to the present embodiment, image information storage method 600 operates to preserve the CDS reset values in CDS data field 464 only when pixel data for a given pixel is to be read out at the last capture and the pixel data at the last capture is not greater than the threshold level. When pixel data for a given pixel is read out and stored at capture intervals prior to the last capture, the pixel data must have already exceeded the threshold level, indicating that the pixel has a large intensity value such that the CDS reset value can be disregarded. In such cases, the CDS reset value can be overwritten with additional bits of pixel data. If the pixel data for a pixel is to be read out and stored at the last capture interval, the pixel intensity value could be a very small value and the CDS reset value needs to be preserved. In accordance with the present invention, the threshold indicator bit (data bit 460) of pixel data field 462 functions as a read/write protection bit for the CDS data field, operating to indicate whether the CDS reset values in the CDS data field of a pixel should be preserved or overwritten.

The image information storage method of the present invention relies on two characteristics of image sensor operations. First, the photodiode voltage of a DPS pixel element is monotonic in nature. That is, the photodiode voltage will either remain the same or increase with exposure time. Therefore, instead of relying on a dedicated threshold indicator bit which can never be altered after the indicator bit is set, the threshold indicator bit can be dynamically set by reexamining the status of the pixel value. A pixel value that has exceeded the threshold level previously will continue to exceed the threshold level so the status of the pixel value can be reassessed at any time. Second, at each capture of pixel data, multiple readouts of the same pixel data can be performed. In this manner, the image information storage method of the present invention can process pixel values falling into different ranges differently.

Turning now to the flowcharts in FIGS. 7A to 7C, at step 602, photodetectors (such as photodiodes) in each of the pixel elements in sensor array 302 (FIG. 5) are reset and the CDS reset values are read out of sensor array 302. At step 604, the CDS reset values for each of the pixel elements in sensor array 302 are stored in data memory 410. In the present embodiment, the CDS reset values are stored as a 4-bit value in CDS data field 464. Referring to FIGS. 8A–8D, a 4-bit CDS reset value is stored in the CDS data field for each of pixels A, B, C and D.

Figure 8A:
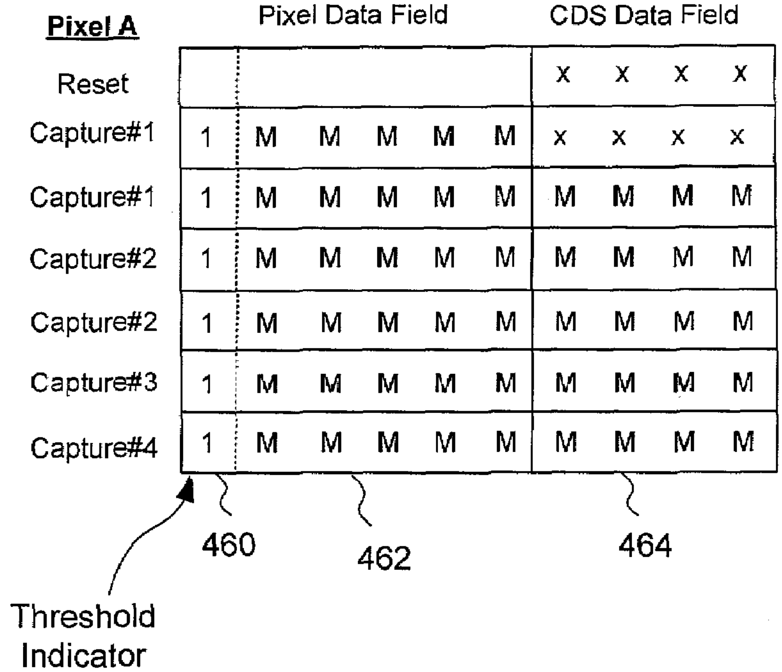
Figure 8B:
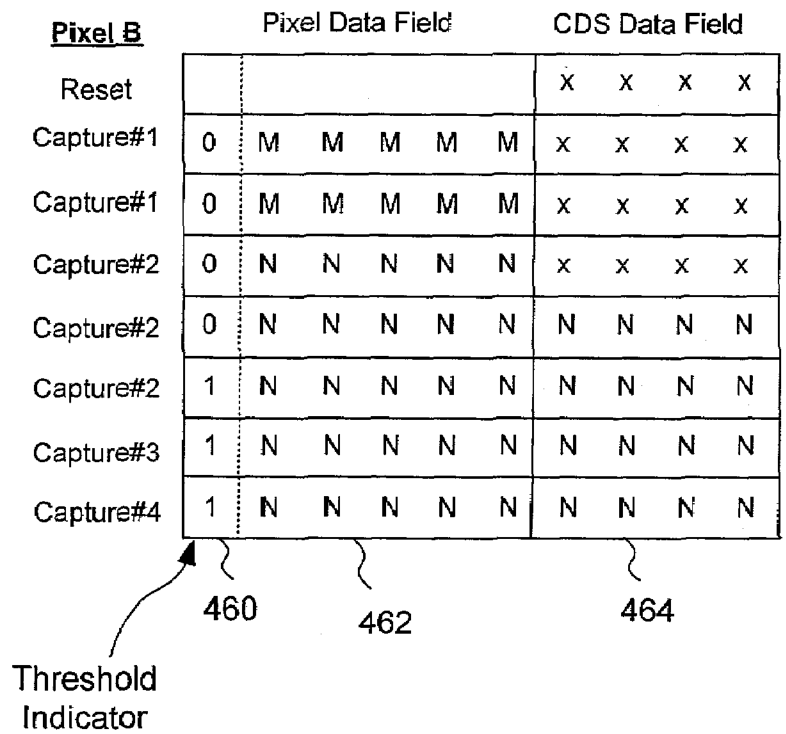

In the present embodiment, the multiple sampling operation of image sensor 300 performs four captures (captures# 1, 2, 3 and 4) during a snapshot of a scene. Captures# 3 and 4 can be two pixel data read out at two nearby exposure times or captures# 3 and 4 can represent two different read out of the pixel data captured at the same exposure time. At step 606, pixel data from sensor array 302 are read out at the first capture interval (capture# 1). At step 608, the upper bits of the pixel data are written into pixel data field 462 of each of the pixel elements in sensor array 302. For example, referring to FIG. 8A, the upper 6 bits of pixel data (1MMMMM) for pixel A are stored in pixel data field 462. Referring to FIGS. 8B–8D, the upper 6 bits of pixel data (0MMMMM) for pixels B, C and D, respectively, are stored in their respective pixel data field.

In the present illustration as shown in FIG. 4, pixel A has exceeded the 50% threshold level at the first capture interval while pixels B, C and D have not. In the present embodiment, the most significant bit (MSB) of the pixel data field serves as the threshold indicator bit and has a value of "1" for indicating that the pixel data has exceeded the threshold level. Thus, in FIG. 8A, pixel A has a value of "1" in the threshold indicator field 460 while the other pixels has a value of "0" in the threshold indicator field 460.

Next, at step 610, image information storage method 600 examines the MSB of the pixel data of each pixel to determine if the pixel data has exceeded the threshold level. If the threshold indicator bit is "1," as in the case of pixel A, the pixel value has exceeded the threshold level. Such a pixel value represents a potentially bright spot in the image. Thus, the CDS reset value for the pixel is no longer needed and the CDS data field can be used to store additional bits of the pixel data (step 612). Referring to FIG. 8A, because the MSB of the pixel data is "1", the CDS reset value (xxxx) is overwritten by additional bits of the pixel data so that the pixel data of pixel A is now represented by a 10-bit number as "1MMMMMMMMM." For pixels B, C and D, because the MSBs of the pixel data of these pixels are "0," the pixel data has not exceeded the threshold level and the CDS reset values are preserved. Pixel data readout for the first capture is thus completed.

Next, the multiple sampling operation proceeds to read out pixel data at the second capture interval (step 614). Referring to FIG. 7B, image information storage method 600 examines the threshold indicator bit 460 stored for each pixel to determine if the pixel data previously stored has already exceeded the threshold level (step 616). If the threshold indicator bit is set to "1", as in the case of pixel A (FIG. 8A), then the pixel data for that pixel will not be further updated. If the threshold indicator bit is not set yet, as in the case of pixels B, C and D (FIGS. 8B, 8C and 8D), image information storage method 600 proceeds to write pixel data for these pixels into the respective memory cells. Specifically, at step 618, image information storage method 600 writes the inverse of the MSB of the pixel data and write the remaining 5 bits of pixel data in the pixel data field.

Then, at step 620, image information storage method 600 proceeds to examine the value of the threshold indicator bit again. Because the inverse of the MSB bit has been written, if the pixel data has exceeded the threshold level, the threshold indicator bit will have a value of "0" instead. If the threshold indicator bit for a particular pixel has a value of "0", then image information storage method 600 will overwrite the CDS data field with additional bits of pixel data (step 622). Referring to FIG. 4, at capture# 2, pixel B has a pixel intensity value exceeding the threshold level while pixels C and D still have pixel intensity values that are below the threshold. The pixel intensity value for pixel A has already crossed the threshold level at capture# 1 and the pixel data for pixel A will not be updated in any of the subsequent captures.

At step 622, image information storage method 600 will overwrite the CDS reset value stored for pixel B with additional bits of pixel data such that pixel data "0NNNNNNNNN" will be stored for pixel B (see FIG. 8B). On the other hand, CDS reset values for pixels C and D will be preserved (see FIGS. 8C and 8D).

Then, at step 624, image information storage method 600 proceeds to restore the value of the threshold indicator bit of pixel B to "1" to indicate that the pixel value for pixel B has exceeded the threshold level and should not be further updated. The threshold indicator bits for pixels C and D are restored to "0" (step 626) to indicate that the pixel values for these pixels have not exceeded the threshold level.

Image information storage method 600 then proceeds to the next capture. If the next capture is not the last capture (step 628), then steps 614 to 626 are repeated to read out pixel data at each of the capture interval as described above. At capture# 3, pixel C exceeds the threshold level and a 10-bit pixel data ("1PPPPPPPPP") for pixel C is stored in data memory 410 (see FIG. 8C).

If the next capture is the last capture, then image information storage method 600 proceeds to read out the pixel data from the sensor array (step 630). For pixel data that are captured at the last capture interval, it is important to preserve the CDS reset values as the pixel data can potentially represent a dark image spot where the CDS reset values can represent a significant error of the recorded pixel data. At step 632, method 600 examines the threshold indicator bit of each pixel element to determine if the bit has been set to "1" previously. If so, method 600 does not further update the pixel data already stored for the pixel (step 634). If the threshold indicator bit has not been set, as in the case of Pixel D, method 600 will record a 6-bit pixel data in the pixel data field (see FIG. 8D). In the present embodiment, method 600 first writes the MSB-1 to 0 bits of the pixel data in the pixel data field (step 636). In FIG. 8D, a value of "QQQQQ" is written into the pixel data field. Then, at step 638, method 600 writes the MSB of the pixel data so that pixel data "QQQQQQ" is stored for pixel D. The 4-bit CDS reset value for pixel D is preserved.

When the image information storage method of the present invention is applied in an image sensor, a more efficient use of memory space can be achieved. By storing the CDS reset values selectively, the size of the on-chip memory can be reduced and more memory can be allocated effectively to store additional pixel data to realize a higher resolution. By reducing the amount of memory cells needed in an image sensor, the image sensor can be manufactured with improved yield and reduced cost.

As mentioned above, image sensor 400 of the present invention uses codewords to represent the pixel intensity values. In the present embodiment, when r bits of memory is used to store the image information for a pixel, and the CDS reset values are expressed in n bits, the codewords can be distributed among the k capture intervals as follows:

(1) For captures# 1 to k-1, codewords are in r-1 bits where the MSB is always a "1", and CDS reset values are encoded in the least significant n-bit of each codeword.

(2) For capture# k, codewords are in r-n or r-n-1 bits.

In one embodiment, when r is 10 bits and k is 4 captures, the first three captures can use 256 codewords with zero bit of CDS information. The last capture can use 48 codewords with 4 bits of CDS rest values.

In the above embodiment, image information storage method 600 alternates between storing zero bit of CDS information or n-bit of CDS information. In an alternate embodiment, a variable size CDS field can be used where, in each of the captures, the image information storage method stores CDS information in different number of bits. In one embodiment, the first two captures can use 29 codewords with zero bit of CDS information, the third capture can use 99 codewords with 1 bit of CDS information, and the last capture can use 48 codewords with 4 bits of CDS information. In yet another embodiment, the first two captures can use 29 codewords with zero bit of CDS information, the third capture can use 163 codewords with one bit of CDS information, and the last capture can use 40 codewords with 4 bits of CDS information. The variable size CDS field allows some CDS information to be preserved for medium to large pixel intensity values.

In the above embodiment, the image information storage method of the present invention uses one bit, the threshold indicator bit, to determine whether the CDS reset values should be preserved or not. In accordance with another embodiment of the present invention, the image information storage method can use two or more bits for read/write protection of the CDS reset values. When the read/write protection of the CDS reset values relies on two or more bits, a more flexible distribution of codewords can be achieved. FIGS. 9A to 9D are memory cells illustrating the progression of image information that are stored in memory cells associated with pixels A, B, C and D of FIG. 4 under the operation of the image information storage method of an alternate embodiment.

Figure 9A:
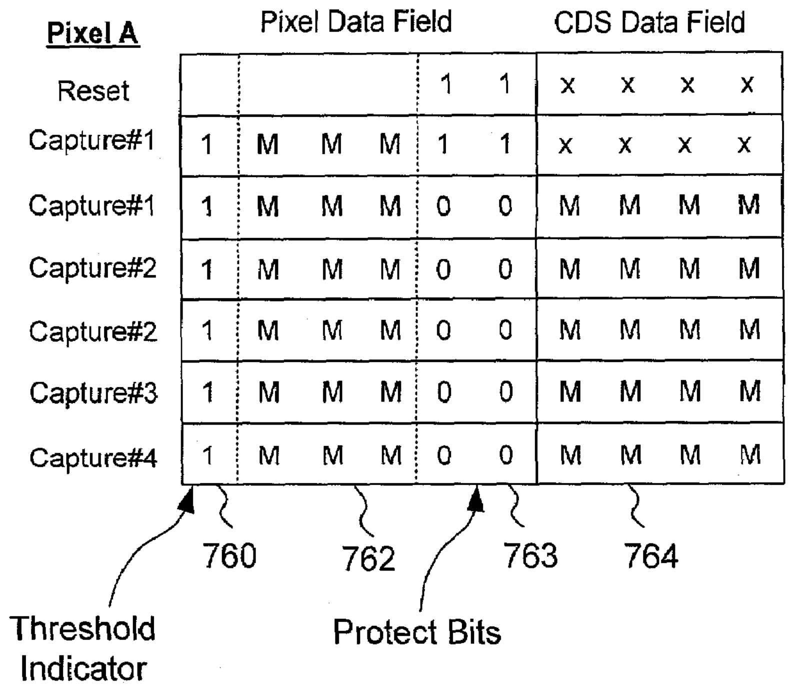
Figure 9B:
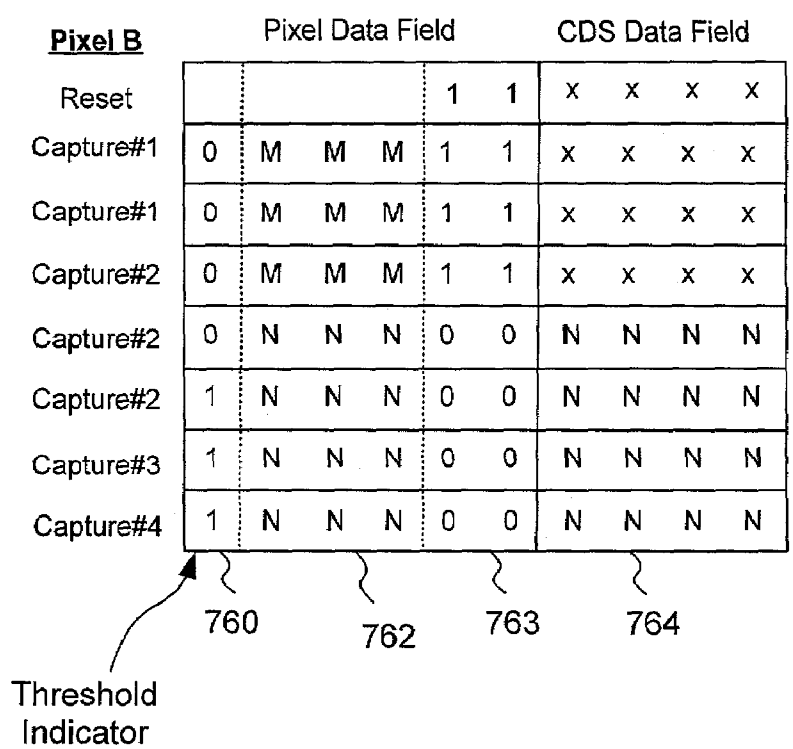

Referring to FIGS. 9A to 9D, pixel data field 762 includes 6 bits of memory cells and CDS data field 764 includes 4 bits of memory cells. In addition to the threshold indicator bit 760, the 2 least significant bits of pixel data field 762 are used as protect bits 763. In this embodiment, the image information storage method uses codewords with "00" in the protect bits to identify pixel data which has exceeded the threshold level such that the pixel data are no longer updated in future captures and the CDS reset values do not need to be preserved. In the present embodiment, the protect bits are ORed together to determine if the CDS reset value for a particular pixel can be written over with pixel data. Referring to FIG. 9D, at the last capture, image information storage method of the present embodiment performs a logical OR operation on protect bits 763 and proceeds to write the 6-bit of pixel data into pixel data field 762. Because the protect bits are ORed together, the protect bits can be sequentially written over with pixel data (QQQQQQ) while preserving the CDS reset value for pixel D.

In the alternate embodiment shown in FIGS. 9A to 9D, two bits of protect bits are used. This is illustrative only and in other embodiments, depending on the size of the pixel data field, two or more bits can be used for the protect bits. As long as the protect bits are ORed together to determine whether the CDS information should be overwritten, the image information storage method can be operated effectively to reduce memory allocation for storing pixel data and related information for a captured image.

The above detailed descriptions are provided to illustrate specific embodiments of the present invention and are not intended to be limiting. Numerous modifications and variations within the scope of the present invention are possible. The present invention is defined by the appended claims.

I claim:

1. An image sensor, comprising:

a sensor array comprising a two-dimensional array of pixel elements, said sensor array outputting digital signals as pixel data representing an image of a scene, and said sensor array generating multiple representations of said image at a plurality of exposure times; and a data memory, in communication with said sensor array, for storing image information for each of said pixel elements, said data memory allocating for each pixel element an m-bit pixel data field for storing pixel data generated by said sensor array and an n-bit CDS data field for storing reset value associated with each pixel element;

wherein said data memory uses a first bit of said pixel data field as a threshold indicator indicating whether pixel data associated with each pixel element has exceeded a predetermined threshold level, said data memory storing m+n bits of pixel data in said pixel data field and said CDS data field for pixel data exceeding said predetermined threshold level and storing m bits of pixel data in said pixel data field for pixel data not exceeding said predetermined threshold level.

2. The image sensor of claim 1, wherein said first bit is the most significant bit of said pixel data field.

3. The image sensor of claim 1, wherein said data memory uses two or more bits as said threshold indicator, said data memory logically ORing said two or more bits of said threshold indicator to determine whether pixel data associated with said pixel element has exceeded said predetermined threshold.

4. The image sensor of claim 3, wherein said two or more bits are the least significant bits of said pixel data field.

5. The image sensor of claim 1, wherein said reset values are generated by resetting said sensor array and reading pixel intensity values from each pixel element of said sensor array after the reset.

6. The image sensor of claim 1, wherein said sensor array outputs said pixel data in codewords, said codewords encoding pixel intensity values and time index values such that each codeword uniquely identifies a pixel intensity value taken at one of said plurality of exposure times.

7. The image sensor of claim 1, wherein said sensor array is fabricated in an integrated circuit.

8. The image sensor of claim 1, wherein said plurality of exposure times comprise any of a relatively short exposure time for capturing image information that is related to high illumination areas in said image, a relatively long exposure time for capturing image information that is related to low illumination areas in said image, and intermediate exposure times for capturing image information that is related to gradually increasing illumination areas in said image; and wherein a combination of said multiple representations of said image at a plurality of exposure time establishes a wide dynamic range for said sensor array.

9. The image sensor of claim 1, wherein, after pixel data for a first representation of said image is read out and stored in said data memory, pixel data for a second representation of said image is selectively read out into said data memory to improve, update or enhance pixel data stored therein for each of said pixel elements.

10. The image sensor of claim 9, wherein said selective read out of said second representation of said image is controlled by said threshold indicator of each of said pixel elements.

11. A method for generating electrical signals representing an image in a digital image sensor, comprising:

resetting said digital image sensor;

generating digital signals as reset values associated with each pixel element, said reset values being indicative of a pixel intensity value at each of said pixel elements after said resetting;

storing said reset values in a data memory, said reset values being stored in an n-bit CDS data field associated with each pixel element;

generating digital signals as pixel data at a plurality of exposure times, said pixel data being associated with each pixel element in a sensor array of pixel elements and corresponding to a level of an analog signal indicative of a light intensity impinging on said pixel element;

determining if said pixel data of a first pixel element exceeds a predetermined threshold value;

if said pixel data exceeds said predetermined threshold value, storing m+n bits of pixel data in an m-bit pixel data field and said n-bit CDS data field in said data memory; and if said pixel data does not exceed said predetermined threshold value, storing m bits of pixel data in said pixel data field of said data memory.

12. The method of claim 11, wherein said determining comprises:

examining a first bit of said pixel data field, said first bit functioning as a threshold indicator, said threshold indicator having a first value indicating said pixel data has exceeded said predetermined threshold value and a second value indicating said pixel data has not exceeded said predetermined threshold value.

13. The method of claim 12, wherein said first bit is the most significant bit of said pixel data field.

14. The method of claim 11, wherein said determining comprises:

examining two or more bits of said pixel data field, wherein a logical OR of said two or more bits functions as a threshold indicator, said threshold indicator having a first value indicating said pixel data has exceeded said predetermined threshold value and a second value indicating said pixel data has not exceeded said predetermined threshold value.

15. The method of claim 14, wherein said two or more bits are the least significant bits of said pixel data field.

16. An image sensor, comprising:

a sensor array comprising a two-dimensional array of pixel elements, said sensor array outputting digital signals as pixel data representing an image of a scene, and said sensor array generating multiple representations of said image at k numbers of exposure times; and a data memory, in communication with said sensor array, for storing image information for each of said pixel elements, said data memory allocating for each pixel element r bits of memory locations for storing pixel data generated by said sensor array and for storing reset value associated with each pixel element;

wherein said data memory uses a first bit of said pixel data field as a threshold indicator indicating whether pixel data associated with each pixel element has exceeded a predetermined threshold level, said data memory storing zero to n-1 bits of reset values for pixel data exceeding said predetermined threshold level at the first to the (k-1)th exposure times, and said data memory storing n bits of rest values for pixel data captured at the (k)th exposure times.

17. The image sensor of claim 16, wherein said data memory stores r to r-n+1 bits of pixel data for pixel data exceeding said predetermined threshold level at the first to the (k-1)th exposure times, and said data memory stores r-n bits of pixel data for pixel data captured at the (k)th exposure times.

18. The image sensor of claim 16, wherein said first bit is the most significant bit of said pixel data field.

19. The image sensor of claim 16, wherein said data memory uses two or more bits as said threshold indicator, said data memory logically ORing said two or more bits of said threshold indicator to determine whether pixel data associated with said pixel element has exceeded said predetermined threshold.

20. The image sensor of claim 19, wherein said two or more bits are the least significant bits of said pixel data field.

* * * * *